Feb. 2, 1932.    T. E. THOMPSON    1,843,183
EDUCATIONAL TEST DEVICE
Filed July 6, 1927
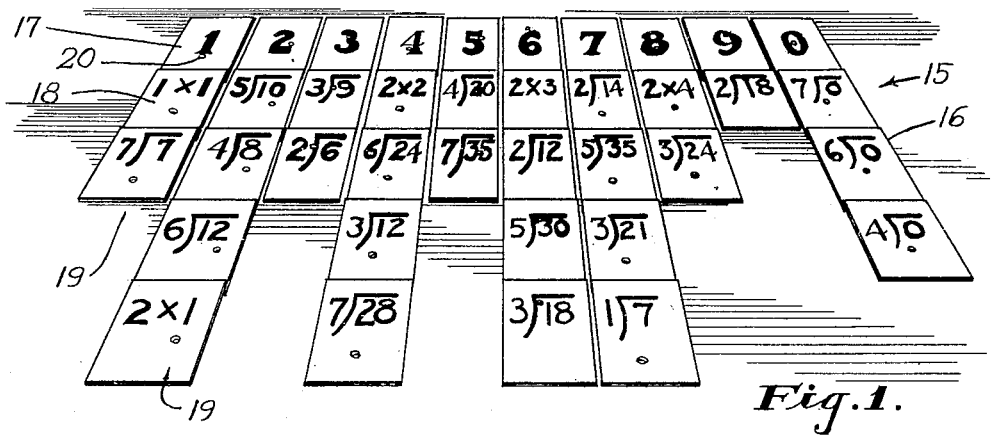
Fig.1.
Fig.2.    Fig.3.    Fig.4.    Fig.5.
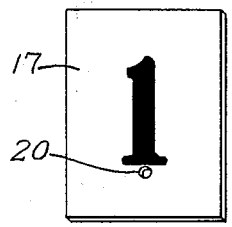  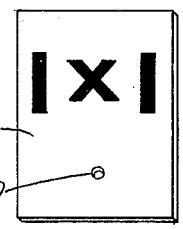  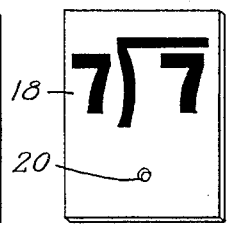  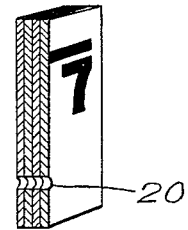
Fig.6.    Fig.7.    Fig.8.    Fig.9.
    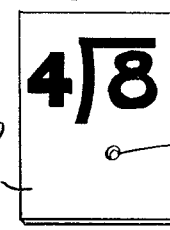  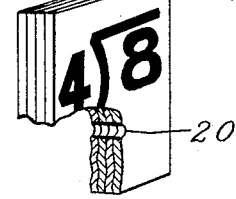
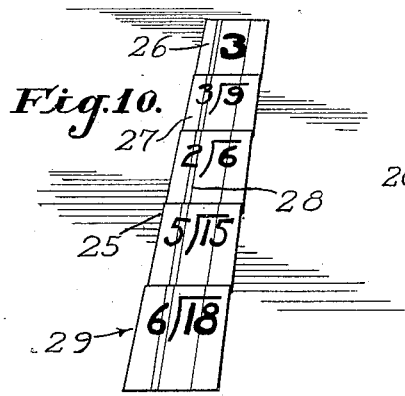
Fig.10.
Fig.11.
Fig.12.
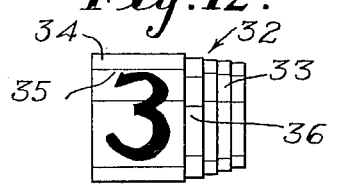
INVENTOR:
THOMAS E THOMPSON,
By Fad W Davis
ATTORNEY Patented Feb. 2, 1932

1,843,183

UNITED STATES PATENT OFFICE

THOMAS E. THOMPSON, OF LOS ANGELES, CALIFORNIA

EDUCATIONAL TEST DEVICE

Application filed July 6, 1927. Serial No. 203,752.

My invention relates to educational devices and more particularly to devices for testing the knowledge of a pupil on any given subject.

It is a general object of my invention to provide a novel educational test device involving the segregation of a plurality of exercise members into groups as a means of indicating a solution of the exercises on said members.

It is a further object of my invention to provide such a device having checking means quickly operable by the pupil himself to ascertain the correctness of this segregation.

It is a still further object of my invention to provide such a device having checking means not easily utilized by the pupil to enable him to segregate the exercise members into proper groups without working the exercises provided on these members.

Another object of my invention is to provide an educational test device in which the proper sequence of a plurality of elements must be determined by the pupil.

A still further object of my invention is to provide an educational test device involving determining sequence in which the correctness of the pupils solution is readily ascertainable after the solution has been made.

Further objects and advantages will be made manifest in the following description and in the accompanying drawings in which a preferred embodiment of my invention is illustrated.

In the drawings, Fig. 1 is a perspective view showing a preferred form of my invention in use.

Fig. 2 is a perspective view illustrating an answer member of my invention.

Figs. 3 and 4 are perspective views illustrating exercise members, the exercises of which are satisfied by the answer of the answer member shown in Fig. 2.

Fig. 5 is a fragmentary perspective view illustrating the answer member of Fig. 2 and the exercise members of Figs. 3 and 4 stacked upon each other.

Figs. 6 to 9 inclusive are views similar to Figs. 2 to 5 respectively and illustrate in the same manner different forms of answer member and exercise members than those illustrated in the foregoing figures.

Figs. 10 and 11 are perspective views illustrating a group of exercise members and a corresponding answer member which are provided with a different form of checking means from that with which the members of the device illustrated in Figs. 1 to 9 inclusive are provided.

Fig. 12 is a plan view illustrating a group of exercise members and a corresponding answer member stacked upon each other in segregated relation, these members being provided with a modified form of checking means which differs from those illustrated in the other figures.

Referring specifically to the drawings, Fig. 1 shows a preferred form 15 of the educational device of my invention which includes a plurality of cards 16 of uniform shape and size, a certain number of which form answer members or cards 17 and others forming exercise members or cards 18. The answer cards 17 are each provided with an answer inscribed upon its face. Each of the exercise cards 18 is provided with an exercise inscribed upon a face thereof. As the device illustrated in Fig. 1 is utilized for giving a test in multiplication and division in arithmetic, the answers provided on the answer cards 17 each comprises a number, while each of the exercises provided upon the exercise cards 18 comprises a problem in multiplication or division in arithmetic. The answers on the various answer cards 17 are different in quantity and the problems provided on the exercise cards 18 are so devised that the correct answer to each one of the problems may be found inscribed upon one of the answer cards 17. Thus, all of the exercise cards may be segregated into groups 19 so that the exercises on the exercise cards of each group are satisfied by the answer on one of the answer cards 17.

In the manufacture of the device 15, each answer card and the group 19 of exercise cards corresponding thereto are provided with checking means which, as shown in Figs. 1 to 9 inclusive, consists of a hole 20 provided in each of the cards so that when each group 19 of exercise cards and its corresponding answer card are stacked, as shown in Fig. 5, the holes 20 in the entire stack will be in alignment. While all of the cards 16 are of the same size and shape, the holes 20 formed in the cards of each group 19 have a different position relative to the cards in which they are formed from the positions of the holes in all the other groups 19.

When the device 15 is put into the hands of the pupil, the answer cards 17 and the exercise cards 18 are in different stacks, the exercise cards being mixed so that the cards of none of the groups 19 are together. The answer cards 17 are first placed in a row by the pupil, as shown in Fig. 1. The pupil then takes up the exercise cards and attempts to solve the exercise thereon. After solving each exercise, he places the card upon which it is inscribed next to the answer card bearing the answer which he has decided satisfies this exercise. This exercise card is placed so that the edge farthest away from the observer overlaps the near edge of the corresponding answer card. When another exercise card has been taken up in which the exercise thereof is satisfied by the same answer, this exercise card is placed with its far edge overlapping the near edge of the first exercise card. When all of the exercise cards have been placed in a similar manner according to the answers which the pupil decides satisfy the exercises thereon, the device 15 will appear as shown in Fig. 1.

The checking means formed by the holes 20 may now be utilized to ascertain whether or not the groups 19 have been properly formed. To accomplish this the cards of each group 19 and the corresponding answer card are slid against each other into a stack, as shown in Fig. 5, in which the cards are accurately superimposed one above the other. If the holes 20 and the cards of the stack are in alignment, the pupil knows that all of the exercise cards in this stack belong in this group 19 and that he has correctly solved the exercise upon each of these cards. If, however, the holes 20 of one or more of the cards of this stack do not align with the hole 20 of the answer card 17 in this stack, he knows that he has erred in solving the exercise on each card whose hole 20 is not so aligned. The exercise cards 18 bearing exercises thus found to have been incorrectly solved are laid aside and after all of the groups into which the pupil has segregated the exercise cards 18 have been checked in the manner pointed out above, the pupil gives his attention to correctly solving the exercises which were previously wrongly solved.

A large number of the devices 15 may be provided for a large class so that the exercise cards of the individual devices vary in character. Thus by giving out each individual device to different pupils on different days no single pupil will be able to become so familiar with the same problems by frequently working them that it will not be necessary for him to solve the problems by mathematical reasoning.

While the holes 20 in the groups 19 are in such widely different positions that the cards of a given group could be easily identified with the corresponding answer card merely by observation of the location of the holes 20, this exaggeration is shown in the drawings purely for the purpose of illustration and does not occur in the actual device as manufactured. As will be noted, it is only necessary to have ten different positions on the cards of the device for the holes 20 so as to accomplish the purpose of the holes as checking means. The holes 20 are quite small in size and these ten different positions can be grouped quite near the center of the card so that it would be almost impossible to group the cards properly by observation of the location of the holes 20 therein.

In some cases it might be desirable to have a checking means which would operate immediately upon the pupil laying down an exercise card adjacent to an answer card so as to indicate at once the correctness or incorrectness of the pupil's solution of the exercise on this exercise card. Such a checking means is provided upon the cards 25, shown in Fig. 10, in which an answer card 26 and exercise cards 27 are each provided with a characteristic set of lines 28 imprinted upon the surface of the card. The lines 28 upon all the cards 25 of a given group 29 would have an individual spacing relative to the card which would correspond to the spacing of the lines 28 on the corresponding answer card 26. Fig. 11 shows the cards 25 telescoped into a stack, which cards are slightly staggered relative to each other so that the projecting ends of the various cards may be compared to ascertain whether the checking lines 28 are in agreement throughout the stack.

In Fig. 12, a stack 32 of exercise cards 33 and an answer card 34 are shown, the cards of this stack being provided with transverse checking lines 35. As will be noted the checking lines 35 of all of the exercise cards 33 are in agreement with the checking lines of the answer card 34 excepting the checking lines of the exercise card 36. The use of transverse checking lines 35, as illustrated in Fig. 12, is of considerable advantage inasmuch as it is impossible for the pupil to check the group 32 of exercise cards 33 with the answer card 34 unless these have the laterally staggered position in which they are shown in Fig. 12. This position is peculiarly a checking position and in order to prevent the pupil making use of the checking means in segregating the cards in the groups 19, the pupil would be forbidden to form the cards in the stacks, as shown in Fig. 12, until the segregation of the cards, as shown in Fig. 1, was completed.

The form of the device illustrated in Fig. 10 differs from the other forms of the device shown, in that it is apparent at once upon the child laying a card down in place whether or not he has made a correct solution of the problem thereon. In the other forms of the device, as shown in Figs. 1 to 9 and 12, however, the checking means may not easily be used by the pupil to avoid the necessity of solving the problems on the exercise sheets in order to segregate the cards into the groups 19.

Other forms of checking means might be utilized such as making the cards of the different groups 19 and their corresponding answer card of a different length or slightly different shape from the cards of the other groups of the device. Another modified form of checking means which is not shown in the drawings comprises the printing of a symbol upon the back of each of the cards 16. These symbols on each of the number cards in the group of answers and the group of exercise cards corresponding thereto are distinctive from the symbols printed on the backs of the other cards 16. For instance, on the back of one number card and its corresponding group of exercise cards could be a star, while other symbols used might comprise circles, squares, triangles, etc.

While the embodiment illustrated herein presents a test in arithmetic, the invention may be used to give a test in almost any subject desired where each of a group of answers satisfies the exercises on a selected group 19 of exercise cards 18.

Because of the many modified forms of device in which my invention might be embodied, I desire that my invention may not be limited in scope beyond a broad interpretation of the appended claims.

I claim as my invention:

1. In an educational test device, the combination of: a plurality of solution members; and a plurality of problem members each related with one of said solution members, said problem members and said solution members having check means for indicating when the problem members have been applied to their related solution members, said check means functioning to indicate the right or wrong placing of the problem members upon alignment of said problem members with said solution members.

2. In an educational test device, the combination of: a plurality of solution members; and a plurality of problem members, each related with one of said solution members, said problem members and said solution members each having check means for indicating when the problem members have been applied to their related solution members, said check means functioning to indicate the right or wrong placing of the problem members upon an alignment of said problem members with said solution members, said check means being in the form of openings formed in said problem members and said solution members.

3. In an educational test device, the combination of: a plurality of groups of problem members; and a plurality of solution members, each of said solution members being related with one group of said problem members, each solution member and each of the related groups of problem members having similar check means for indicating when the problem members have been applied to their related solution members, said check means of each group being disposed differently from those of the other groups and functioning to indicate the right or wrong placing of the problem members upon an alignment of said problem members with said solution members, said check means of each group aligning when said members are aligned provided however that the members be properly matched.

4. In an educational device, the combination of: a plurality of problem members each having thereon a different complete problem; and a plurality of solution members each having thereon a complete answer to at least one of said problems, the solution members collectively providing correct answers for all of said problems, and each problem member being adapted to be selectively matched with any of said solution members regardless of whether or not the selected answer correctly answers the problem on the problem member thus matched, each solution member and the related problem member for which said solution member carries the correct answer being provided with checking means disposed for co-alignment when the correlated problem and solution members are correctly matched, the checking means of the different correlated solution and problem members being differently disposed so that by alignment or disalignment said checking means function to indicate a right or wrong selective matching of the problem members with the solution members.

5. In an educational device, the combination of: a plurality of solution members each having thereon a different answer; and a plurality of groups of problem members, the respective members of each group having thereon different problems all answerable by the answer on one of said solution members, all of the problem members being adapted to be selectively matched with any of the solution members regardless of whether or not the selected answers correctly answer the problems on the problem members thus matched, each solution member and each of the correlated group of problem members for which said solution member carries the correct answer being provided with checking means disposed for co-alignment when the correlated solution and problem members are correctly matched, the checking means of the different groups of problem members and correlated solution members being differently disposed so that by alignment or disalignment said checking means function to indicate a correct or incorrect selective matching of said problem members with said solution members.

6. In an educational device a multiplicity of cards each having symbols thereon expressing certain thoughts, said cards appearing under casual observation to be of approximately the same physical characteristics, the symbols on certain of the cards bearing a logical relationship to each other and no logical relationship with the symbols on the other cards, certain physical characteristics being identical in all the cards having a logical relationship to each other and differing from the remaining cards so that when the cards are stacked one upon the other, the presence in the stack of a card not logically related to the other cards of the stack can be readily detected.

7. In an educational device, the combination of: a plurality of cards each having symbols thereon, the symbols on each card of a series of said cards being logically related to the symbols on the remaining cards of said series and not logically related to any of said cards not in said series, all of said cards appearing upon casual inspection to be of approximately the same physical characteristics, the physical characteristics of all the cards in any series being sufficiently similar to each other and sufficiently different from all the cards not belonging in that series to enable the prompt detection of a card not properly belonging in a series, upon stacking the cards, if a card not belonging to said series is included in said stack.

8. In an educational test device, the combination of: a plurality of groups of separate exercise members, each exercise member having symbols thereon defining a certain exercise; and a plurality of separate answer members, each answer member having symbols thereon denoting a certain answer, all of said answers being different, each of said answers applying to the exercises defined on all of the exercise members of a single group, and each of said answer and exercise members having identifying characteristics independent of said symbols, the identifying characteristic of each answer member and its related exercise members being the same and differing from the identifying characteristics of all the other members comprised in the device.

9. In an educational test device, the combination of: a plurality of groups of separate exercise members, each exercise member having symbols thereon defining a certain exercise; and a plurality of separate answer members, each answer member having symbols thereon denoting a certain answer, all of said answers being different, each of said answers applying to the exercises defined on all of the exercise members of a single group, and each of said answer and exercise members having identifying characteristics independent of said symbols, the identifying characteristic of each answer member and its related exercise members being the same and differing from the identifying characteristics of all the other members comprised in the device, the similarity between the identifying characteristic of each answer member and each of the exercise members logically associated therewith being obvious when said answer member and any of said exercise members are placed in juxtaposition.

10. In an educational test device, the combination of: a plurality of groups of separate exercise members, each exercise member having symbols thereon defining a certain exercise; and a plurality of separate answer members, each answer member having symbols thereon denoting a certain answer, all of said answers being different, each of said answers applying to the exercises defined on all of the exercise members of a single group, and each of said answer and exercise members having identifying characteristics independent of said symbols, the identifying characteristic of each answer member and its related exercise members being the same and differing from the identifying characteristics of all the other members comprised in the device, the similarity between the identifying characteristic of each answer member and each of the exercise members logically associated therewith being obvious when said answer member and any of said exercise members are stacked on each other.

11. In an educational test device, the combination of: a plurality of groups of separate exercise members, each exercise member having symbols thereon defining a certain exercise; and a plurality of separate answer members, each answer member having symbols thereon denoting a certain answer, all of said answers being different, each of said answers applying to the exercises defined on all of the exercise members of a single group, and each of said answer and exercise members having identifying characteristics independent of said symbols, the identifying characteristic of each answer member and its related exercise members being the same and differing from the identifying characteristics of all the other members comprised in the device, the similarity between the identifying characteristic of each answer member and each of the exercise members logically associated therewith being obvious when said answer member and any of said exercise members are stacked on each other, the identifying characteristic consisting of holes so placed that a hole on each member registers with a hole on the other when the members are so stacked.

12. In an educational device the combination of a plurality of exercise members, said exercise members bearing symbols from which respective deductions may be drawn, certain deductions being the same and differing from the other deductions whereby the said exercise members may be arranged in groups based on the deductions.

In testimony whereof, I have hereunto set my hand at Los Angeles, California, this 1st day of July, 1927.

THOMAS E. THOMPSON.